United States Patent
Klinkicht et al.

(10) Patent No.: US 9,638,878 B2
(45) Date of Patent: May 2, 2017

(54) OPTICAL COUPLING DEVICE AND OPTICAL COMMUNICATION SYSTEM

(75) Inventors: Sven Klinkicht, Berlin (DE); Alexander Eichler-Neumann, Berlin (DE); Gaul Holger, Berlin (DE)

(73) Assignee: FCI Asia Pte. Ltd., Singapore (SG)

( * ) Notice: Subject to any disclaimer, the term of this patent is extended or adjusted under 35 U.S.C. 154(b) by 0 days.

(21) Appl. No.: 14/400,138

(22) PCT Filed: May 11, 2012

(86) PCT No.: PCT/IB2012/001070
§ 371 (c)(1),
(2), (4) Date: Feb. 5, 2015

(87) PCT Pub. No.: WO2013/167928
PCT Pub. Date: Nov. 14, 2013

(65) Prior Publication Data
US 2015/0168658 A1  Jun. 18, 2015

(51) Int. Cl.
*G02B 6/38* (2006.01)
*G02B 6/42* (2006.01)

(52) U.S. Cl.
CPC ......... *G02B 6/4286* (2013.01); *G02B 6/3807* (2013.01); *G02B 6/4214* (2013.01);
(Continued)

(58) Field of Classification Search
CPC .. G02B 6/4286; G02B 6/3807; G02B 6/4274; G02B 6/4214; G02B 6/4245; G02B 6/4257; G02B 6/4246
(Continued)

(56) References Cited

U.S. PATENT DOCUMENTS

| | | | | |
|---|---|---|---|---|
| 5,577,142 A | * | 11/1996 | Mueller-Fiedler ... | G02B 6/4214 385/131 |
| 5,696,862 A | * | 12/1997 | Hauer ................. | G02B 6/4214 385/14 |

(Continued)

FOREIGN PATENT DOCUMENTS

| | | |
|---|---|---|
| CN | 1659461 A | 8/2005 |
| JP | 2004063580 A | 2/2004 |

(Continued)

*Primary Examiner* — Thomas A Hollweg
*Assistant Examiner* — Guy Anderson
(74) *Attorney, Agent, or Firm* — Wolf, Greenfield & Sacks, P.C.; Edmund J. Walsh

(57) ABSTRACT

An optical coupling device including a housing, a first optical port provided on the housing, a second optical port provided on the housing and configured to couple to an optical fiber cable, an optical signal path guiding optical signals between the first and second optical port, a monitoring device provided on the housing, and an decoupling element optically coupled to the optical signal path and the monitoring device for coupling an optical monitoring signal coupled out from the optical signals guided between the first and second optical port onto the monitoring device. Furthermore, an optical communication system is provided, the system including an optical module with an optical signal processing device, the optical signal processing device being configured for at least one of receiving optical signals by a receiving device and transmitting optical signals by an optical signal source, and an optical coupling device guiding the optical signals.

16 Claims, 1 Drawing Sheet

Figure 1:
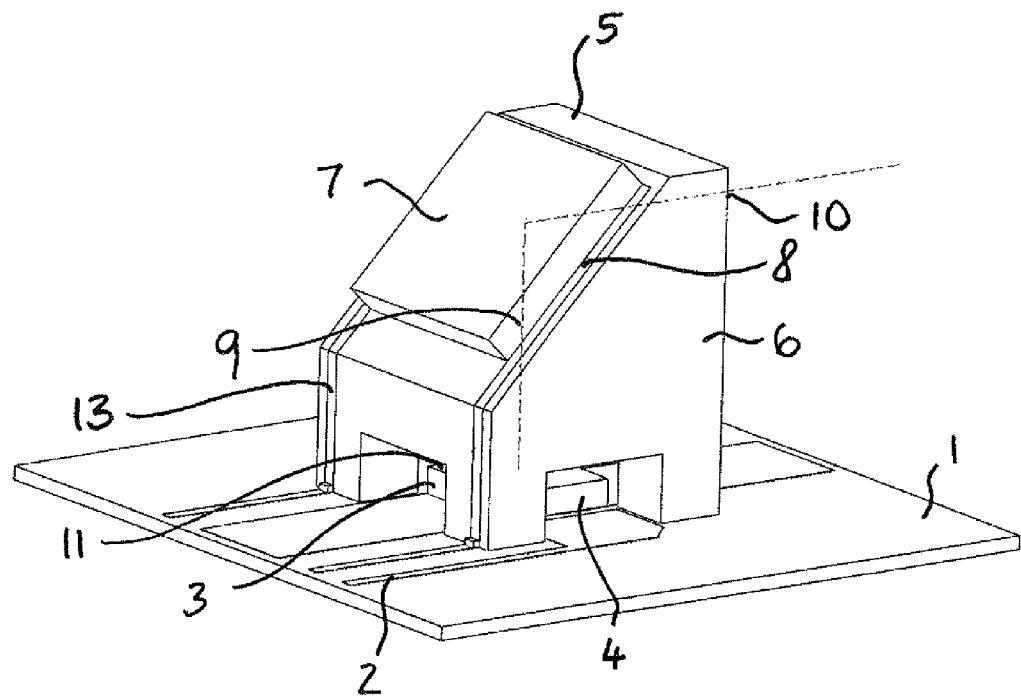

(52) U.S. Cl.
CPC ......... *G02B 6/4245* (2013.01); *G02B 6/4257* (2013.01); *G02B 6/4274* (2013.01); *G02B 6/4246* (2013.01)

(58) Field of Classification Search
USPC .............................. 385/14–15, 31, 39–40, 73
See application file for complete search history.

(56) References Cited

U.S. PATENT DOCUMENTS

| | | | | |
|---|---|---|---|---|
| 5,883,988 | A * | 3/1999 | Yamamoto | G02B 6/42 250/227.15 |
| 5,929,518 | A * | 7/1999 | Schlaiss | G02B 6/4214 257/415 |
| 6,081,638 | A * | 6/2000 | Zhou | G02B 6/4214 372/108 |
| 6,205,274 | B1 * | 3/2001 | Zhou | 385/38 |
| 6,264,377 | B1 * | 7/2001 | Mitsuda | G02B 6/4246 257/E33.067 |
| 6,408,121 | B1 | 6/2002 | Goto | 385/129 |
| 6,521,989 | B2 * | 2/2003 | Zhou | 257/698 |
| 6,530,697 | B1 * | 3/2003 | Johnson | G02B 6/29311 385/33 |
| 6,600,845 | B1 * | 7/2003 | Feldman | G02B 6/4204 385/14 |
| 6,758,607 | B2 * | 7/2004 | Nakabayashi et al. | 385/88 |
| 6,792,178 | B1 * | 9/2004 | Zhou | G02B 6/4214 385/31 |
| 6,841,733 | B2 * | 1/2005 | Schiaffino | G02B 6/42 174/650 |
| 6,869,230 | B2 * | 3/2005 | Cheng et al. | 385/88 |
| 7,050,678 | B1 * | 5/2006 | Isono et al. | 385/39 |
| 7,083,333 | B2 * | 8/2006 | Hodgson | G02B 6/4292 385/53 |
| 7,322,754 | B2 * | 1/2008 | Wolf | G02B 6/4214 385/88 |
| 7,412,137 | B2 * | 8/2008 | Suzuki | G02B 6/4214 385/39 |
| 8,529,139 | B2 * | 9/2013 | Kathman | G02B 6/34 385/14 |
| 8,774,576 | B2 * | 7/2014 | Shiraishi | G02B 6/42 385/14 |
| 8,810,866 | B2 * | 8/2014 | Fujii | H01S 5/02296 250/216 |
| 8,913,889 | B2 * | 12/2014 | Ogawa et al. | 398/38 |
| 2004/0017978 | A1 | 1/2004 | Kuhara et al. | 385/49 |
| 2004/0074661 | A1 * | 4/2004 | Schiaffino | G02B 6/42 174/539 |
| 2004/0101259 | A1 | 5/2004 | Kilian | 385/93 |
| 2004/0136001 | A1 * | 7/2004 | Nishimura | H01S 5/02252 356/416 |
| 2004/0175072 | A1 | 9/2004 | Lam et al. | |
| 2004/0208601 | A1 | 10/2004 | Tan et al. | |
| 2011/0243490 | A1 | 10/2011 | Ryf | |

FOREIGN PATENT DOCUMENTS

| | | |
|---|---|---|
| JP | 2011211152 A | 10/2011 |
| WO | WO 2004/063784 A1 | 7/2004 |
| WO | WO-2011106871 A1 | 9/2011 |

\* cited by examiner

OPTICAL COUPLING DEVICE AND OPTICAL COMMUNICATION SYSTEM

The present invention refers to new technologies in the field of optical communication systems.

RELATED APPLICATION

This application is the U.S. National Stage of International Patent Application Number PCT/IB2012/001070, entitled "OPTICAL COUPLING DEVICE AND OPTICAL COMMUNICATION SYSTEM," filed May 11, 2012. The entire contents of the foregoing are hereby incorporated herein by reference.

BACKGROUND

Optical communication devices are used for transmitting and/or receiving optical signals used for optical data communication. Prior to transmission, the optical signals are generated by a light source, for example by a laser diode. Optical signals transmitted are received by an optical receiver such as a photo diode. Transmission of optical signals may be performed by an optical fiber cable comprising one or more optical fibers.

For guiding optical signals between an optical transmitter/receiver (transceiver) and an end portion of an optical cable a so-called optical coupling devices or optical coupling unit may be used. Within the optical coupling device an optical signal path is provided between optical ports of the optical coupling device. One of the optical ports is configured for receiving the optical signals from the optical transmitter and/or for transmitting the optical signals to the optical receiver. Another optical port of the optical coupling device which is connected to the optical port by the optical path is configured for receiving the optical signals from and/or for transmitting the optical signals to the optical fiber.

In optical communication devices, a (partially) transparent coupling unit may be used for beam or signal guidance and/or building an optical signal path by using lenses and reflective optical surfaces. If the optical signal, for example, is generated by a laser device, it might be necessary to control or monitor the optical output power of the laser. For implementation of such monitoring feature, a part of the optical signal is coupled out to a photo diode, which may also be referred to as monitor diode, in order to measure the present optical output power of the laser by an electronic circuit. The monitor diode is often located in close vicinity to the laser on the same surface (substrate) as the laser.

SUMMARY OF THE INVENTION

It is an object of the invention to provide improved technologies for optical communication devices which allow for higher integration of device components. Also, the device design shall be simplified.

According to one aspect of the invention, an optical coupling device is provided, the device comprising a housing, a first optical port provided on the housing, a second optical port provided on the housing and configured to couple to an optical fiber cable, an optical signal path guiding optical signals between the first and second optical port, a monitoring device provided on the housing, and an decoupling element optically coupled to the optical signal path and the monitoring device for coupling an optical monitoring signal coupled out from the optical signals guided between the first and second optical port onto the monitoring device.

According to an other aspect of the invention, there is a optical communication system, comprising an optical module comprising an optical signal processing device, the optical signal processing device being configured for at least one of receiving optical signals by a receiving device and transmitting optical signals by an optical signal source, and an optical coupling device guiding the optical signals.

The optical coupling device may be used for providing guidance for optical signals to be transmitted between components of an optical communication system. In one embodiment, optical signals may be received through the second optical port provided on the housing of the optical coupling device. If the second optical port is coupled to an end portion of an optical fiber cable, optical signals transmitted by the cable are received via the second optical port. Following, the optical signals received are guided along the optical signal path provided in the housing to the first optical port. The guided optical signals are leaving the housing trough the first optical port to be, for example, received by an optical receiver, such as a photo diode.

In an alternative embodiment, optical signals sent out by an optical signal source, such as a laser diode, are received trough the first optical port provided on the housing. Following, the received optical signals are guided along the optical signal path to the second optical port for coupling the optical signals into an optical fiber cable which is connected to the second optical port. In still another embodiment, the optical coupling device may be used in conjunction with an optical transceiver for bi-directional guiding optical signals within the optical coupling unit along the optical signal path.

The optical light source may comprise an array of a plurality of light source, e.g. a laser diode array. Referring to such embodiment, the monitoring device may receive light coupled out from all the light sources. In some other embodiment, the monitoring device may be provided with several monitoring sub-devices which, for instance, are implemented by a plurality of photo diodes. The monitoring sub-devices may receive light from one or more light sources. Also, a combination of monitoring mechanisms may be provided in which one or more monitoring sub-devices receive light coupled out from (only) one light source, and one or more other monitoring sub-devices are receiving light coupled out from several light sources.

According to an aspect of the invention, one or more strip conductors are provided on the housing, the strip conductors being connected to a connector port of the monitoring device. The strip conductors may be provided like conductor strips on a printed circuit board.

In one embodiment, the decoupling element is a light guiding element provided in the optical signal path. For example, the decoupling element is a light or beam reflection element being partially transparent, thereby, coupling out some of the light being reflected on the surface of the light reflection element.

In a preferred embodiment, the monitoring device is provided on the decoupling element. It could also be said that the decoupling element is provided on the monitoring device. For example, the monitoring diode may be provided on a backside of the decoupling element which, for example, may be provided by the light reflection element. Light coupled out from the optical signals guided along the optical signal path by the decoupling element provides for the optical monitoring signal which will be coupled to the monitoring device.

According to a further embodiment, the decoupling element and the monitoring device are provided as an integrated functional unit.

In still a further embodiment, the decoupling device is provided with a partially transparent reflection element, the reflection element being part of a cover of the monitoring device. For example, the reflection element may be part of a cover covering a sensitive area of the monitoring device which may be provided with a photo diode. Optical signals which are hitting the cover of the monitoring device will be reflected on the surface, but some of the light will be coupled out by going through the reflection element and will hit the sensitive area of the monitoring device.

According to a preferred embodiment, a light guiding element located in the optical signal path is provided on an inner surface of the housing. For example, a surface area on the inner side of the housing may be provided with some reflection coating for providing a light reflection element. Such light reflection element is integrated into the housing of the optical coupling device.

In another preferred embodiment, the second optical port comprises a female connector for receiving a male connector provided on an end portion of an optical fiber cable. In an alternative embodiment, there is a male connector provided on the housing for receiving a female connector provided on an end portion of an optical fiber.

Following, further aspects of the invention are described by referring to preferred embodiments. In the figures, FIG. 1 shows a schematic representation of an optical communication system, and FIG. 2 shows a schematic representation of an optical coupling device.

Figure 2:
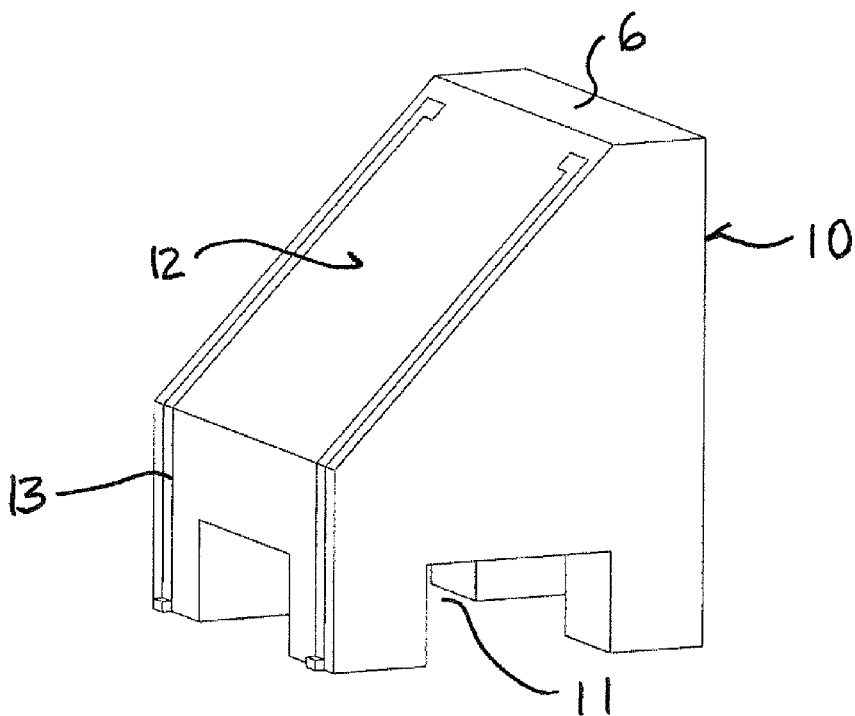

FIG. 1 shows a schematic representation of an optical communication system comprising a substrate 1 provided with a printed circuit board. On the substrate 1 strip conductors 2 are provided for electrically connecting system components. Among several system components, there is an optical transmitter 3 provided with a laser diode 4 generating optical signals. According to FIG. 1 there is an optical coupling device 5 located on the substrate 1 above the optical transmitter 3.

On a housing 6 of the optical coupling device 5 a monitoring device 7 is provided on the backside of a light reflection element 8 which is part of an optical signal path 9 provided in the housing 6 for guiding optical signals between a first and second optical port 10, 11 provided on the housing 6. Along the optical signal path 9 optical signals are guided between the first optical port 10 and the second optical port 11. The second optical port 11 is configured to couple to an end portion of an optical fiber cable (not shown) for coupling the guided optical signals into an optical fiber of the optical fiber cable. For example, coupling may be provided by a ferrule connector.

If the optical signals are generated by the optical transmitter 3, the optical signals are received in optical coupling device or unit 5 through the second optical port 11. Following, the optical signals are guided along the optical signal path 9 to the first optical port 10. In another mode of operation, optical signals received from the optical fiber cable are guided from the first optical port 10 to the second optical port 11 to be received by an optical receiver (not shown). Preferably, the optical receiver is also provided in the substrate 1.

Referring to FIG. 2, there is an enlarged representation of the housing 6 of the optical coupling device. On an outer surface 12 of the housing 6 there are strip conductors 13 connecting to the strip conductors 2 on the substrate 1 as well as the monitoring device 7 (see FIG. 1).

The portion of the optical signal which leads to the monitoring device 7 can be realized by properties of the surface for example mechanical or optical structures in the surface such as lenses, grooves, spares. The portion of the optical signal which is led to the monitoring device 7 can also be realized by using different material combination or by the application of a coating. A structure in the mounting area of the monitor diodes can also be designed to minimize optical crosstalk between the channels in an array setup. It is possible to realize the mirror in the optical path with a coating of the photosensitive area.

Mounting of the monitoring device 7 can be realized by adhesive bonding, welding, mechanically or by another joining technology. Also, printing, or other types of deposition (chemical deposition, electrolytic deposition, vapour deposition) of the monitor diodes directly on the coupling unit is possible. In such a way, the monitoring structure can be directly applied on the coupling unit forming one single part.

If it is advantageous for the mounting or fabrication of the monitoring device 7 together with the coupling unit, another physical effect to detect light can be used, e.g. light sensitive resistors, pyroelectric or photoelectric effects etc.

The conductor paths of the optical coupling unit 5 made of metal prepregs can be inserted or realized by overmolding, adhesive bonding, welding, deposition (chemical deposition, electrolytic deposition, vapour deposition) or with another joining technology. It is also possible to use a flexible substrate for printing the strip conductors 2 either with electronic ink or with thick film pastes or to realize cavities or embossments in the coupling unit 5 in order to realize conductor paths within/thereon.

The optical coupling device 5 is useful for single lasers as well as for laser arrays.

The features disclosed in this specification, the figures and/or the claims may be material for the realization of the invention in its various embodiments, taken in isolation or in various combinations thereof.

The invention claimed is:

1. An optical coupling device configured for mounting to a substrate, the optical coupling device comprising:
   a housing,
   a first optical port provided on the housing, the first optical port being positioned on the housing to pass light perpendicular to the substrate,
   a second optical port provided on the housing and configured to couple to an optical fiber cable, the second optical port being positioned on the housing to pass light parallel to the substrate,
   a decoupling element located on or formed by an angled portion of the housing and positioned to provide an optical signal path guiding optical signals between the first and second optical port, wherein the decoupling element provides a monitoring signal path for an optical monitoring signal coupled out from the optical signal path between the first and second optical port, and
   a monitoring device provided on the angled portion of the housing, the monitoring device being positioned to receive the optical monitoring signal.

2. Device according to claim 1, further comprising one or more strip conductors provided on the housing, the strip conductors being connected to a connector port of the monitoring device.

3. Device according to claim 1, wherein the decoupling element is a partially transparent reflective coating provided in the optical signal path between the first optical port and the second optical port.

4. Device according to claim 1, wherein
the monitoring device is provided on the decoupling element.

5. An optical coupling device, configured for mounting to a substrate, the optical coupling device comprising:
a housing,
a first optical port provided on the housing, the first optical port being positioned on the housing to pass light perpendicular to the substrate,
a second optical port provided on the housing and configured to couple to an optical fiber cable, the second optical port being positioned on the housing to pass light parallel to the substrate,
a decoupling element optically coupled to the optical signal path to provide a monitoring signal coupled out from the optical signal path between the first and second optical port, and
a monitoring device to receive the monitoring signal, wherein the decoupling element and the monitoring device comprise an integrated functional unit attached to an angled surface of the housing.

6. Device according to claim 5, wherein the decoupling device is provided with a partially transparent reflection element, the reflection element being part of a cover of the monitoring device.

7. Device according to claim 1, wherein a light guiding element located in the optical signal path is provided on an inner surface of the housing.

8. Device according to claim 1, wherein the second optical port comprises a female connector for receiving a male connector provided on an end portion of an optical fiber cable.

9. An optical communication system, comprising
an optical module comprising an optical signal processing device, the optical signal processing device being configured for at least one of receiving optical signals by a receiving device and transmitting optical signals by an optical signal source, and
an optical coupling device according to claim 1, the optical coupling device guiding the optical signals.

10. System according to claim 9, wherein the optical coupling device is provided above at least one of the receiving device and the optical signal source.

11. System according to claim 9, wherein the optical signal processing device comprises a substrate, the substrate comprising electrical connectors connected to one or more strip conductors provided on the housing of the optical coupling device.

12. Device according to claim 1, wherein one or more strip conductors extend along an exterior surface of the housing.

13. Device according to claim 12, wherein the one or more strip conductors on the exterior surface of the housing are configured to be directly connected to one or more strip conductors on a substrate.

14. Device according to claim 1, wherein the monitoring device is provided directly on the housing.

15. A system comprising the device according to claim 1, wherein:
the system further comprises the substrate and an optical transmitter, and
the housing is located on the substrate above the optical transmitter.

16. Device according to claim 1, wherein:
the first optical port is positioned on a first surface of the housing;
the housing has an opening, sized to receive an optical transmitter, adjacent the first surface.

* * * * *